(12) United States Patent
Gass et al.

(10) Patent No.: US 11,525,601 B2
(45) Date of Patent: Dec. 13, 2022

(54) FLEXIBLE DUCT CONNECTOR PROCESSING SYSTEM

(71) Applicant: PRODUCTION PRODUCTS, INC., Charlotte Hall, MD (US)

(72) Inventors: Richard Christopher Gass, Charlotte Hall, MD (US); Drew Evan Miles, II, Charlotte Hall, MD (US)

(73) Assignee: PRODUCTION PRODUCTS, INC., Charlotte Hall, MD (US)

( * ) Notice: Subject to any disclaimer, the term of this patent is extended or adjusted under 35 U.S.C. 154(b) by 327 days.

(21) Appl. No.: 16/859,464

(22) Filed: Apr. 27, 2020

(65) Prior Publication Data
US 2021/0215386 A1     Jul. 15, 2021

Related U.S. Application Data

(60) Provisional application No. 62/959,415, filed on Jan. 10, 2020.

(51) Int. Cl.
*F24F 13/02*     (2006.01)
*B21D 1/02*     (2006.01)
*B23D 31/02*     (2006.01)

(52) U.S. Cl.
CPC .......... *F24F 13/0245* (2013.01); *B21D 1/02* (2013.01); *B23D 31/02* (2013.01); *F24F 13/0209* (2013.01)

(58) Field of Classification Search
CPC .... F24F 13/0245; F24F 13/0209; B21D 1/02; B23D 31/02

USPC ........................................................ 29/561
See application file for complete search history.

(56) References Cited

U.S. PATENT DOCUMENTS

| | | | |
|---|---|---|---|
| 3,197,850 A | 8/1965 | Gracer | |
| 3,197,860 A | 8/1965 | Gracer | |
| 3,214,807 A | 11/1965 | Hinden | |
| 4,820,564 A | 4/1989 | Cologna et al. | |
| 5,948,509 A * | 9/1999 | Felson | F24F 13/0218 428/192 |
| 7,104,104 B1 * | 9/2006 | Hermanson | F24F 13/0209 72/370.26 |
| 8,276,425 B2 * | 10/2012 | Borwig | F16L 9/003 72/51 |
| 8,499,604 B2 * | 8/2013 | Borwig | B21D 5/04 29/521 |
| 10,976,070 B1 * | 4/2021 | Albers | F24F 13/0263 |
| 11,213,878 B2 * | 1/2022 | Daw | B21D 5/16 |

* cited by examiner

*Primary Examiner* — Craig M Schneider
*Assistant Examiner* — David R Deal
(74) *Attorney, Agent, or Firm* — Katten Muchin Rosenman LLP

(57) ABSTRACT

The flexible duct connector processing system of the present invention comprises a decoiler machine and a processing machine. The decoiler machine stores one or more rolls of flexible duct connector stock which are fed to the processing machine. The processing machine beads, notches, and cuts the flexible duct connector stock according to programmed instructions received from a control system. A conveyor system disposed after the processing machine optionally collects the cut flexible duct connector stock and conveys it in batches.

20 Claims, 16 Drawing Sheets

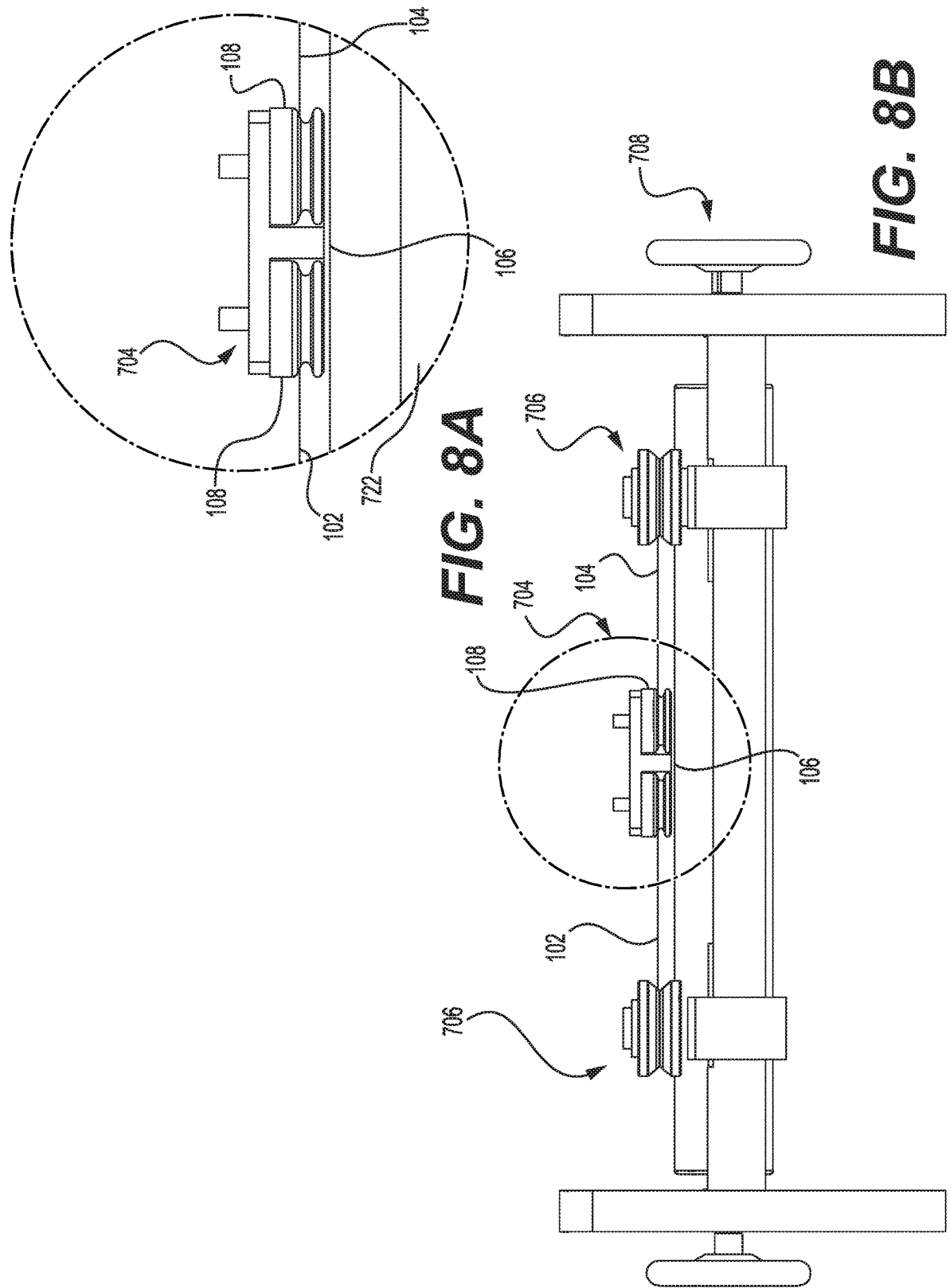

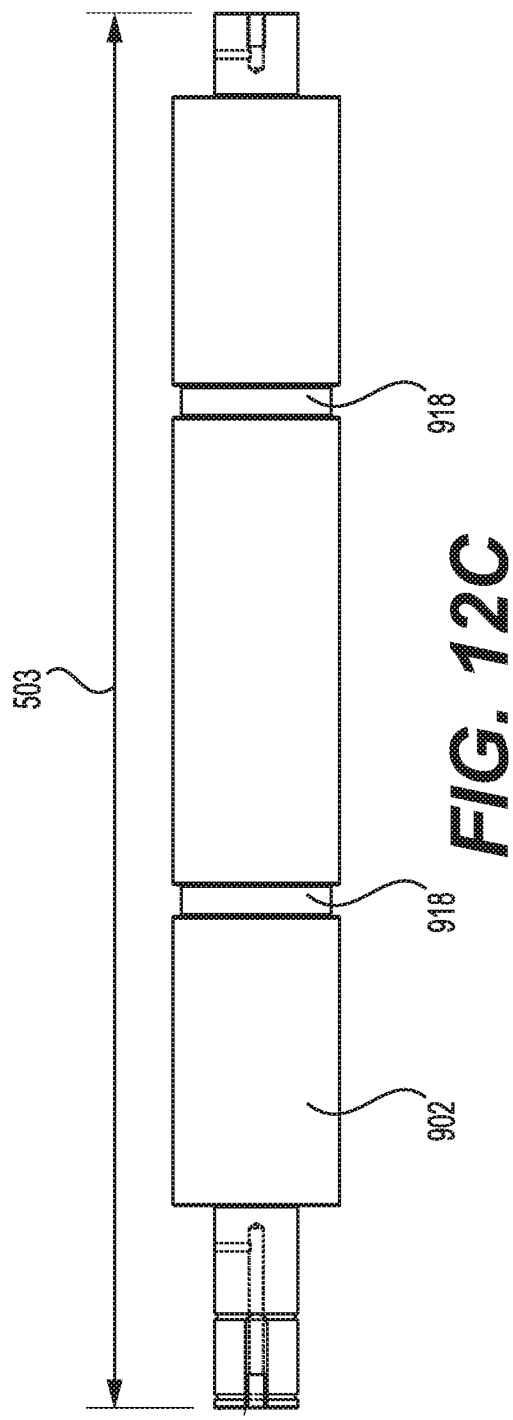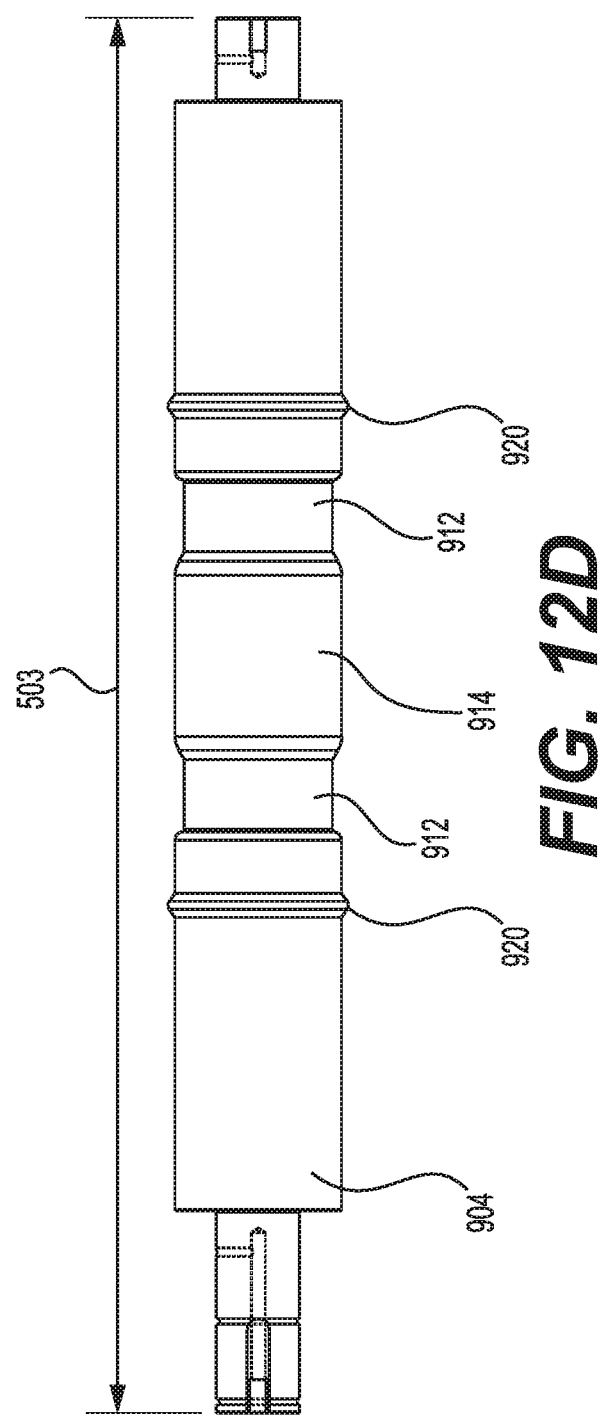

FLEXIBLE DUCT CONNECTOR PROCESSING SYSTEM

CROSS-REFERENCE TO RELATED APPLICATIONS

This application claims priority to U.S. Provisional Application Ser. No. 62/959,415, filed Jan. 10, 2020, the entire contents of which are hereby incorporated by reference in their entirety.

FIELD OF THE INVENTION

The present invention discloses a flexible duct connector processing system for automating the notching, beading, and cutting of flexible duct connector frames.

BACKGROUND

It is conventional practice in the air conduits of air conditioning and heating systems to interpose, between lengths of metal conduit, sections of flexible duct connector material. For years now, flexible duct connector stock has been used, most importantly, to reduce or eliminate vibrations in sheet metal conduits or ducts when connected to the plenum of a furnace or air handler. Due to the vibration absorbing fabric of the flexible duct connector material, vibrations made by the air handler or furnace are not transferred to the ductwork system.

Representative patents showing the structure of the Flexible Duct Connector Stock and the flexible connector material are disclosed in U.S. Pat. No. 3,197,850, issued Aug. 3, 1965; 3,197,860, issued Aug. 3, 1965; 3,214,807, issued Nov. 2, 1965; and 4,820,564, issued Apr. 11, 1989, the entire contents of which are hereby incorporated by reference in their entirety. The Flexible Duct Connector Stock is generally produced and sold in boxes of 100' rolls.

Flexible duct connector frames are made to the various sizes of which is would be connected to the furnace or air handler and the opposing conduits (duct). In order to make a duct connector frame, a length of flexible duct connector stock is manually pulled off/out of the 100-foot rolls, the length is measured by hand (tape measure), and then severed. Once the length is severed, the flexible duct connector stock must be bent into a frame. The flexible duct connector stock is notched manually on each side of each metal strip. These notches indicate where the bend will be made to turn the measured length into a duct connector frame.

When flexible duct connector stock is produced/manufactured and packaged, the flexible fabric is sewn between the two corresponding metal strips is tucked or folded underneath the middle of these metal strips. FIG. 1 depicts a front perspective view of cut flexible duct connector stock 100. As shown, the flexible duct connector stock 100 comprises two metal strips 102 and 104 connected by fabric 106 to form an airtight connection. Various techniques are used to connect metal strips 102 and 104 to fabric 106, such as bending of the metal over the fabric, adhesives, etc. In FIG. 1, metal strips 102 and 104 are coupled to fabric 106 at seams 108.

Multiple metal duct connector frames typically need to be formed at once which requires accurate measuring and notching to form each frame. A common problem involved with forming the duct connector frames is that the fabric 106 can cause the metal strips 102 and 104 to vary in width due to bunching of the fabric 106. If measurements are made when the fabric 106 is not completely stretched/taut, it can lead to inaccuracies in the notching and the resulting duct connector frame cannot be used. Therefore, there exists a need for a system which can accurately pull, notch, and sever the flexible duct connector stock to form duct connector frames.

SUMMARY

The flexible duct connector processing system of the present invention comprises a decoiler machine and a processing machine. The decoiler machine stores one or more rolls of flexible duct connector stock which are fed to the processing machine. The processing machine beads, notches, and cuts the flexible duct connector stock according to programmed instructions received from a control system. A conveyor system disposed after the processing machine optionally collects the cut flexible duct connector stock and conveys it in batches.

BRIEF DESCRIPTION OF THE DRAWINGS

FIGS. 8A and 8B depict cross-section views of the spreading out and guiding unit.

FIGS. 12C-12D depict view of the beading rollers.

DETAILED DESCRIPTION

Figure 1:
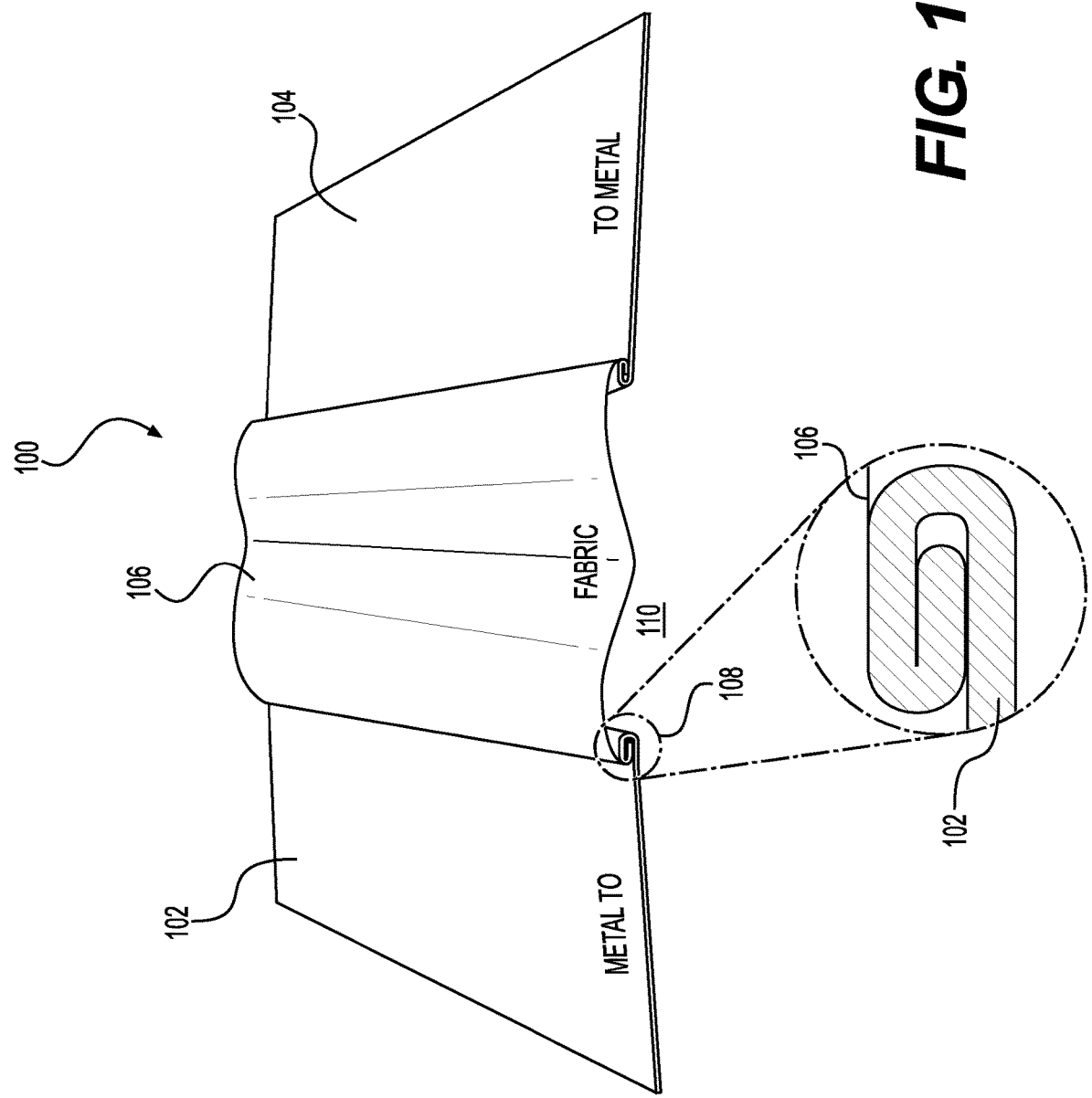
FIG. 1 depicts a front perspective view of flexible duct connector stock.
Figure 3:
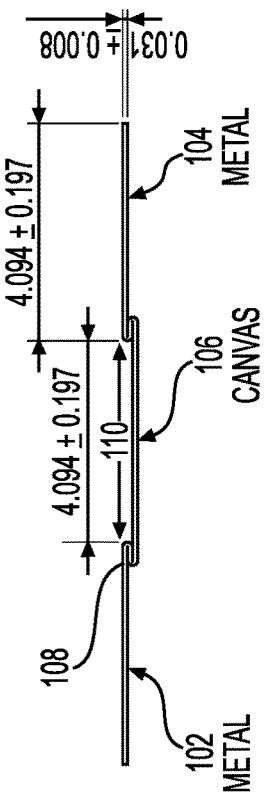
FIG. 3 depicts a cross-section view of 4" flexible duct connector stock
Figure 2:
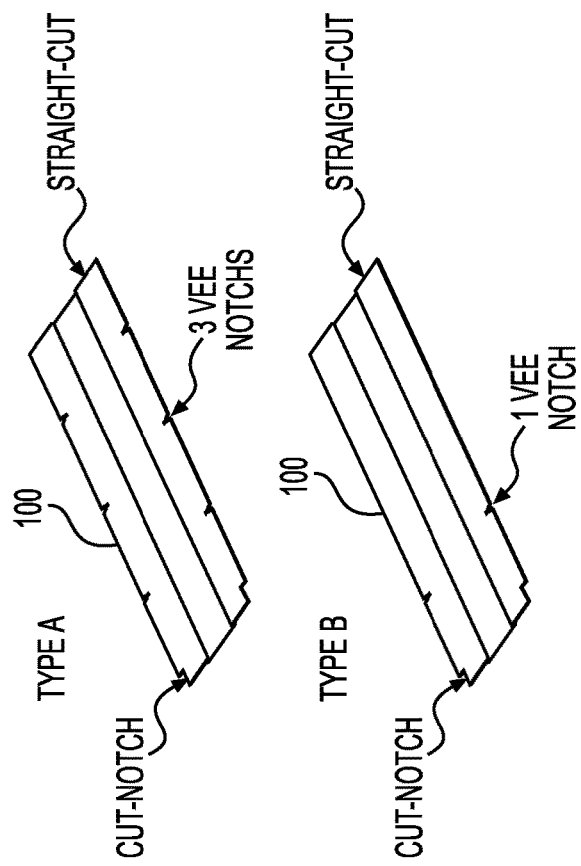
FIG. 2 depicts a cross-section view of 3" flexible duct connector stock.

As already discussed, FIG. 1 depicts a front perspective view of flexible duct connector stock 100 comprising metal rails 102 and 104 joined by fabric 106 at seams 108. FIG. 2 depicts a cross-section view of 3" flexible duct connector stock 100 showing the typical dimensions. An important feature to note here is that when fabric 106 is held taught and metal rails 102 and 104 are parallel, the height difference between the metals rails 102 and 104 and the fabric 106 caused by the seam 108 forms a rectangular notch 110 approximately 0.031" in depth and 3.228" in width. The same rectangular notch 110 of similar depth also exists in the 4" flexible duct connector stock as shown in FIG. 3, with only the width being different. As will be described with respect to the following figures, the flexible duct connector processing system 600 of the present invention utilizes expanding rollers which are able to interface with the edges of rectangular notch 110 along seams 108 to keep fabric 106 taut and to feed the flexible duct connector stock 100 for accurate cutting and notching.

Figure 4:
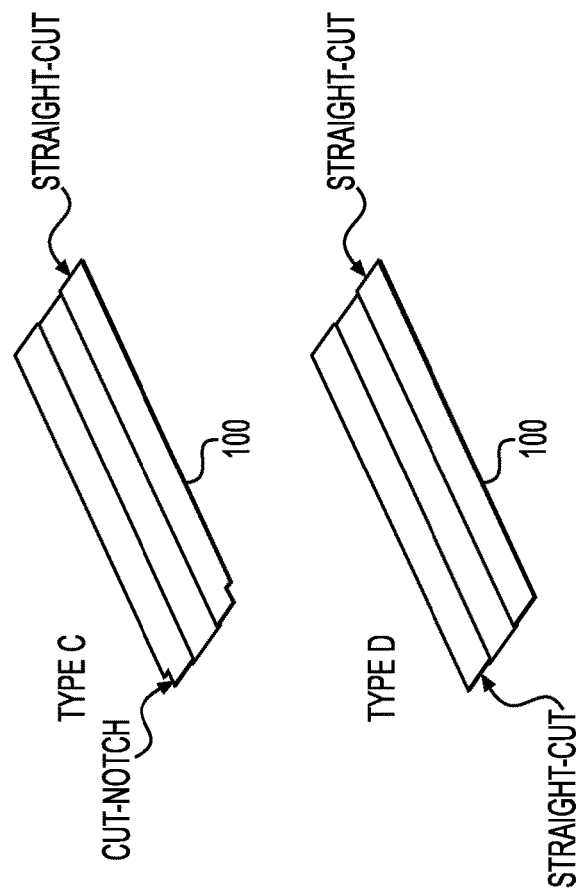
FIG. 4 depicts four examples of types (A-D) of cuts possible with the flexible duct connector processing system of the present invention.
Figure 5:
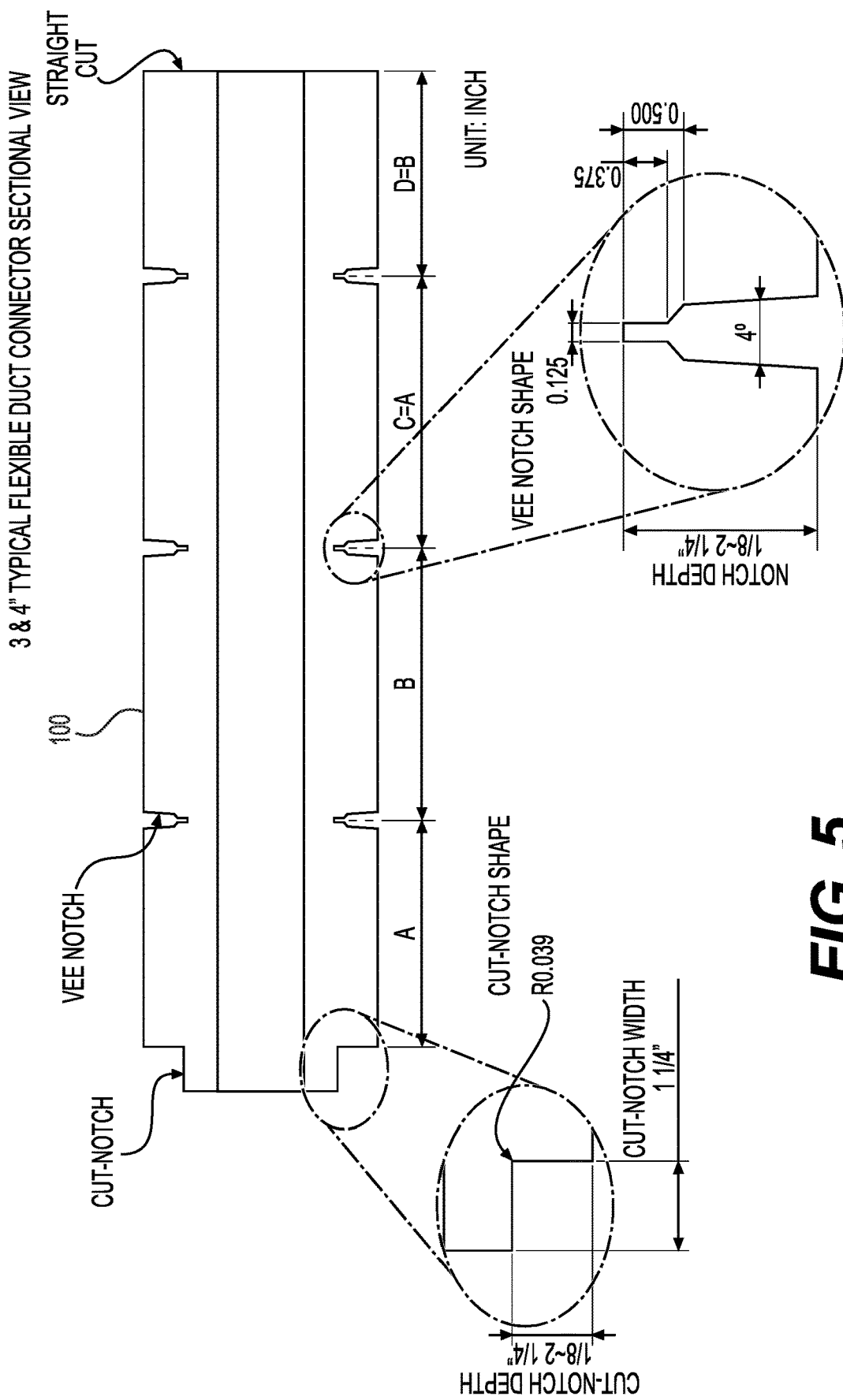
FIG. 5 depicts sample measurements for notches and cuts produced using the flexible duct connector processing system.

FIG. 4 depicts four example types (A-D) of cut and notch combinations possible with the flexible duct connector processing system 600 of the present invention. However, it should be apparent to one of ordinary skill in the art that any combination of square notches and Vee notches would be possible. Type A has a straight cut at a first end of the flexible duct connector stock 100, 3 Vee notches, and a cut notch. Type A is a typical cut and notch pattern used when forming a duct connector frame. Type B has a straight cut, one Vee notch, and a cut notch. Type C has a straight cut with a cut notch. Type D has straight cuts on both ends. FIG. 5 depicts various example measurements for the Vee notches and cut notches shown in FIG. 4. As would be obvious to one of ordinary skill in the art, Types A-D are usually cut by hand one-by-one whose creation can be automated through use of the flexible duct connector processing system 600 of the present invention.

In a preferred embodiment, each cut notch has a width of 1¼" and a depth of ⅛" to 2¼". Each Vee notch depth is preferably ⅛"-2¼". The preferred dimensions for the cut notch and the Vee notch are depicted in FIG. 5.

Figure 6:
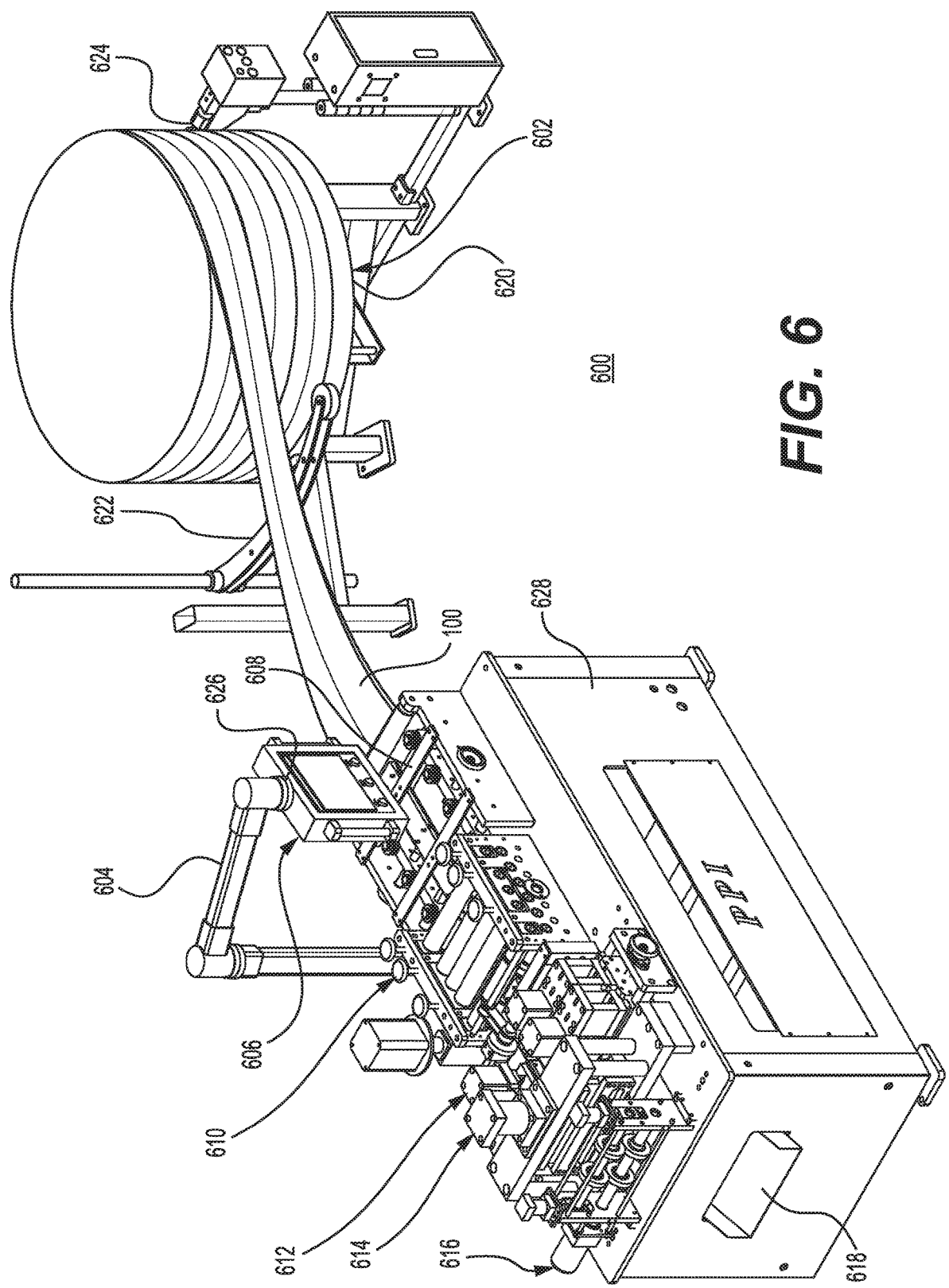
FIG. 6 depicts an embodiment of the flexible duct connector processing system.

FIG. 6 depicts the flexible duct connector processing system 600 comprising decoiler machine 602 and processing machine 604. Rolls of flexible duct connector stock 100 up to 1000' long and stacked up to eight high can be placed decoiler machine 602 and the end of the flexible duct connector stock can be fed into processing machine 604.

Decoiler machine 602 generally comprises rotatable base 620, hold down arm 622, and roller assembly 624. The rolls of flexible duct connector stock 100 are placed on rotatable base 620 which rotates as processing machine 604 pulls the flexible duct connector stock 100. Hold down arm 622 provides constant pressure to the outside of the roll as it continues to be made smaller. The flexible duct connector stock 100 is fed through the roller assembly 624 which, together with hold down arm 622, maintains a tight wind of the flexible duct connector stock 100. As each roll is depleted, the height of hold down arm 622 and roller assembly 624 can be adjusted vertically to interface with the next roll in the stack of rolls.

Processing machine 604 comprises control system 606, spreading out and guiding unit 608, levelling unit 610, notching unit 612, shearing unit 614, and puling-out unit 616. Control system 606 controls the operation of processing machine 604 and provides a user interface which allows for the settings of how the flexible duct connector stock 100 should be cut and where notches should be cut along its length. For example, a user may utilize display 626 to select preset types of cuts (e.g., Types A-D) or may use display 626 to input custom instructions.

Control system 606, spreading out and guiding unit 608, levelling unit 610, notching unit 612, shearing unit 614, and puling-out unit 616 are all preferably releasably coupled to base 628 using a bolted or other secure connection. This allows any of the units to be removed for servicing or replaced for wear without the need to disassemble the entirety of processing machine 604.

The flexible duct connector stock 100 is fed into processing machine 604 through spreading out and guiding unit 608 from decoiler machine 602. An expanding roller set 704 contacts seams 108 of the flexible duct connector stock 100 and spreads apart fabric 106. The expanding roller set 704 maintains the fabric 106 in the spread position during the entire traversal of the flexible duct connector stock 100 through the processing machine 604.

In a first embodiment, the width of the expandable roller set 704 is set at a constant width (e.g., for 3" or 4" stock) according to the type of flexible duct connector stock 100. However, in other embodiments, the expandable roller set 704 may exert an outward spring force on the seams 108. Then, as the expandable roller set 704 wears down over time, the outward spring force maintains the force on the seams 108 even as the rollers become smaller.

Outside metal edge guide rollers 706 also interface the outer edges of metal strips 102 and 104 as will be shown later, opposing the expandable roller set 704 to spread out and guide the flexible duct fabric connector stock 100.

Figure 7A:
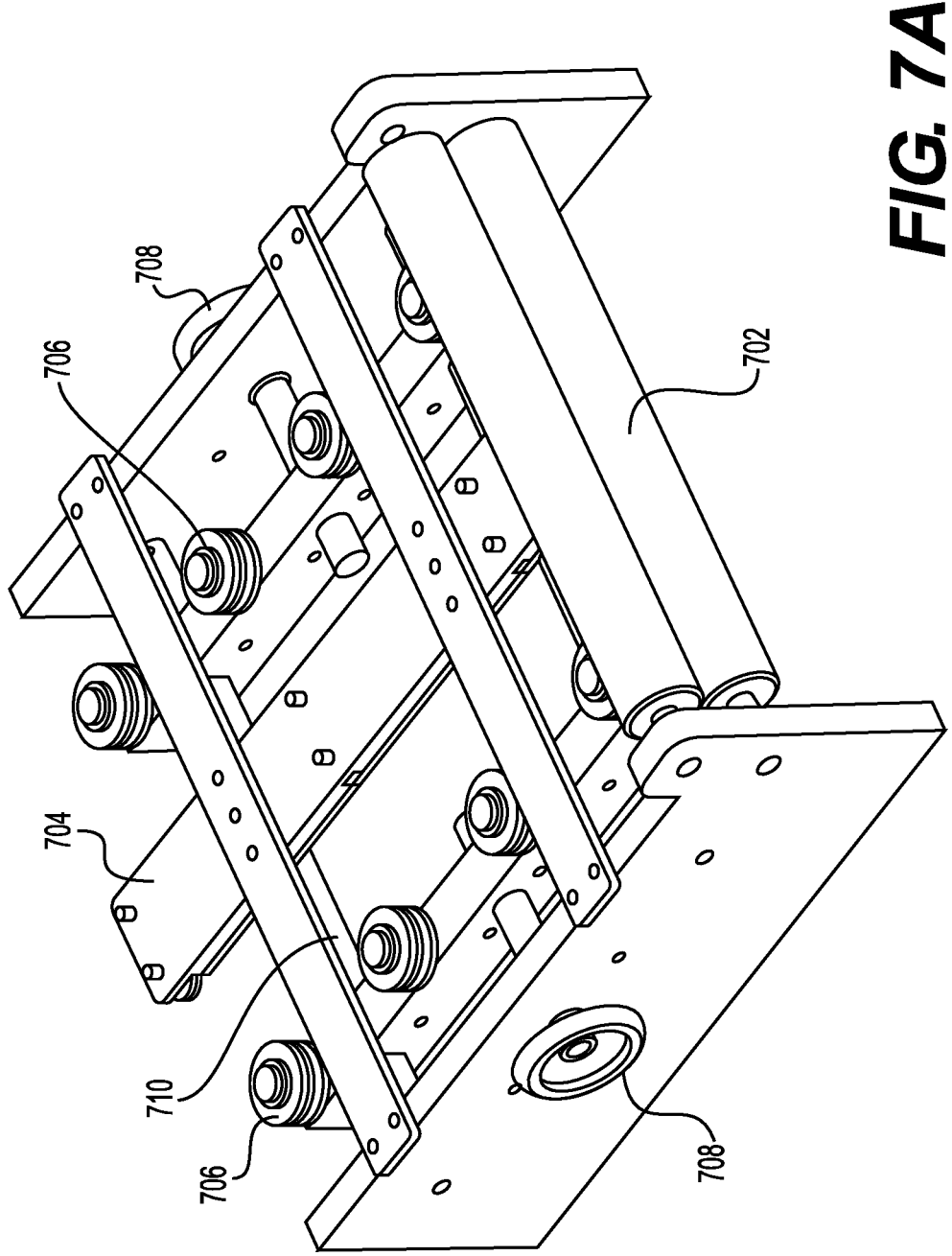
FIGS. 7A and 7B depict top and bottom perspective views of the spreading out and guiding unit.
Figure 7B:
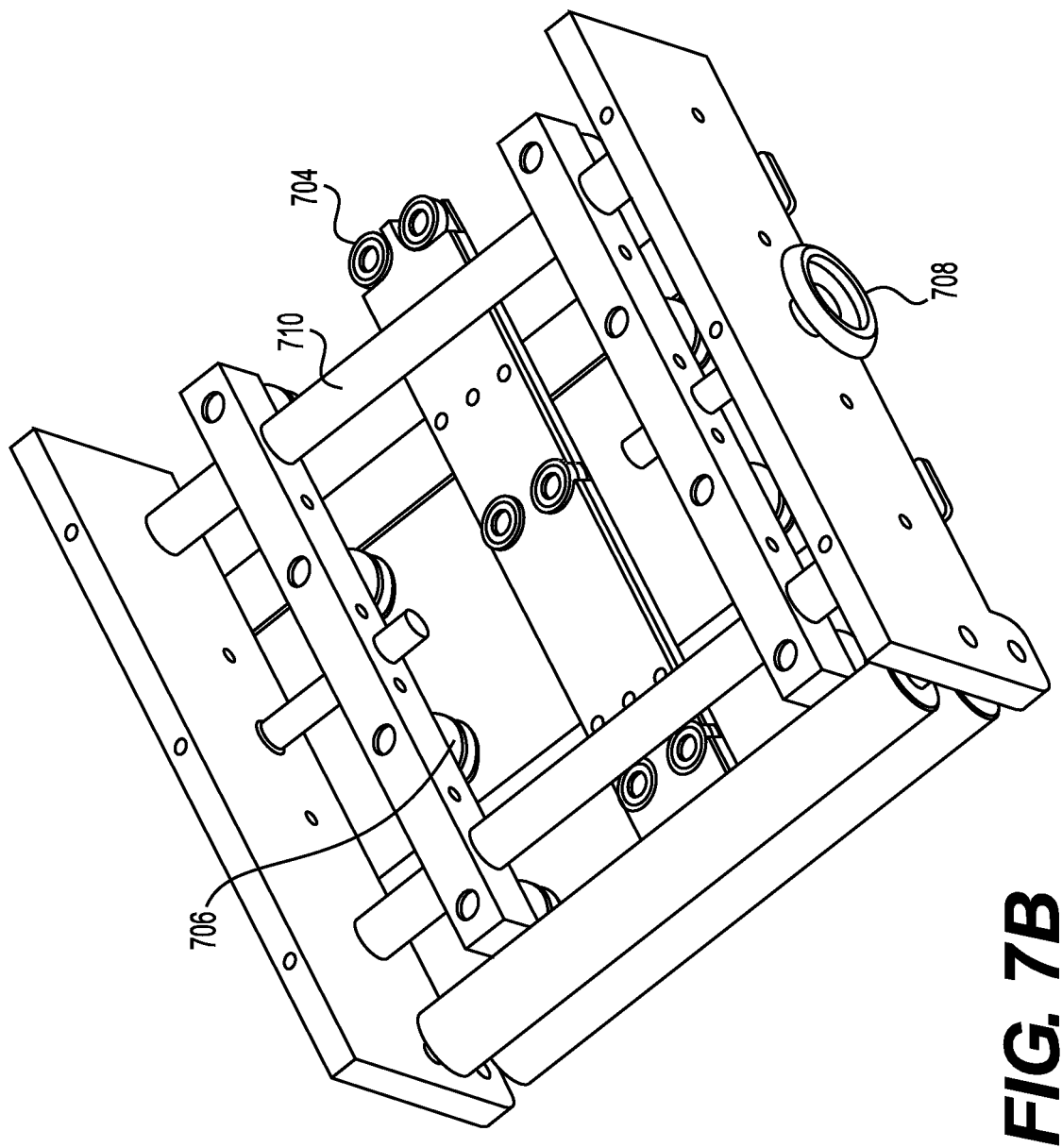

Features of the spreading out and guiding unit 608 are depicted in additional detail in FIGS. 7A-7B and 8A-8B. As shown, the flexible duct connector stock 100 first engages entry rollers 702 (FIG. 7A) which help to pull the flexible duct connector stock 100 from decoiler machine 602. Preferably, one or both of entry rollers 702 are powered to enable smooth feeding of the flexible duct connector stock 100. As best shown in FIG. 7B, the expanding roller set 704 comprises a plurality of spaced rollers, with each side interfacing with a separate seam 108. FIG. 8A, in particular, depicts the interface between a single set of the rollers from expanding roller set 704 and seam 108. The separation between the sets of rollers is set in advance to accommodate the width of rectangular notch 110 (which the rollers must fit in), which is different based on the type of flexible duct connector stock 100 being used.

Simultaneously, a plurality of outer rollers 706 engage the outer edges of metal rails 102 and 104 as depicted in FIG. 8B. An adjustment guide 708 on each side of spreading out and guiding unit 608 allows the width of the outer rollers 706 to be varied to accept various sizes of flexible duct connector stock 100 (e.g., 3" or 4"). For example, as adjustment guide 708 is turned, the outer rollers 706 are moved along guide rods 710 depicted in FIGS. 7A and 7B. The combination of expansion rollers 704 and outer rollers 706 help to level the curled flexible duct connector stock 110 as it enters levelling unit 610.

Figure 9B:
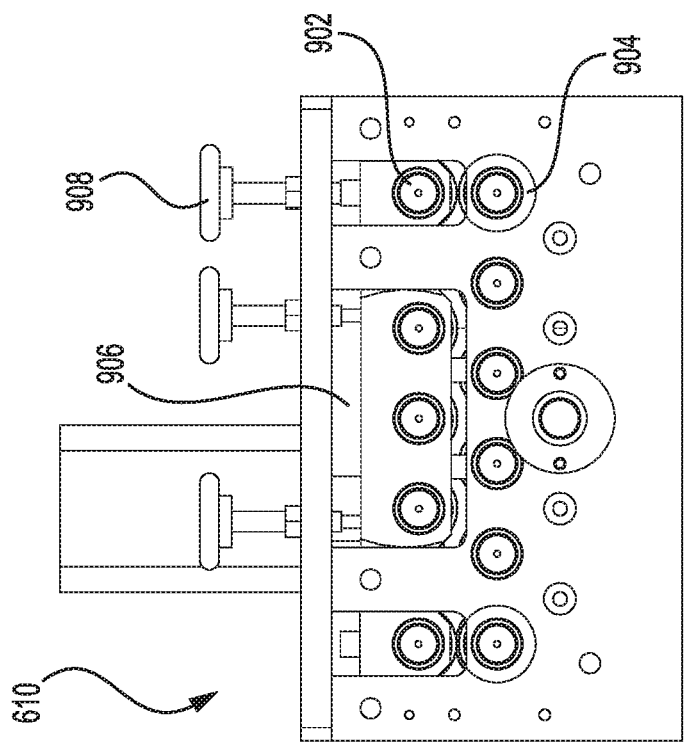
FIGS. 9A and 9B depict a perspective and a side view of the levelling unit.
Figure 9A:
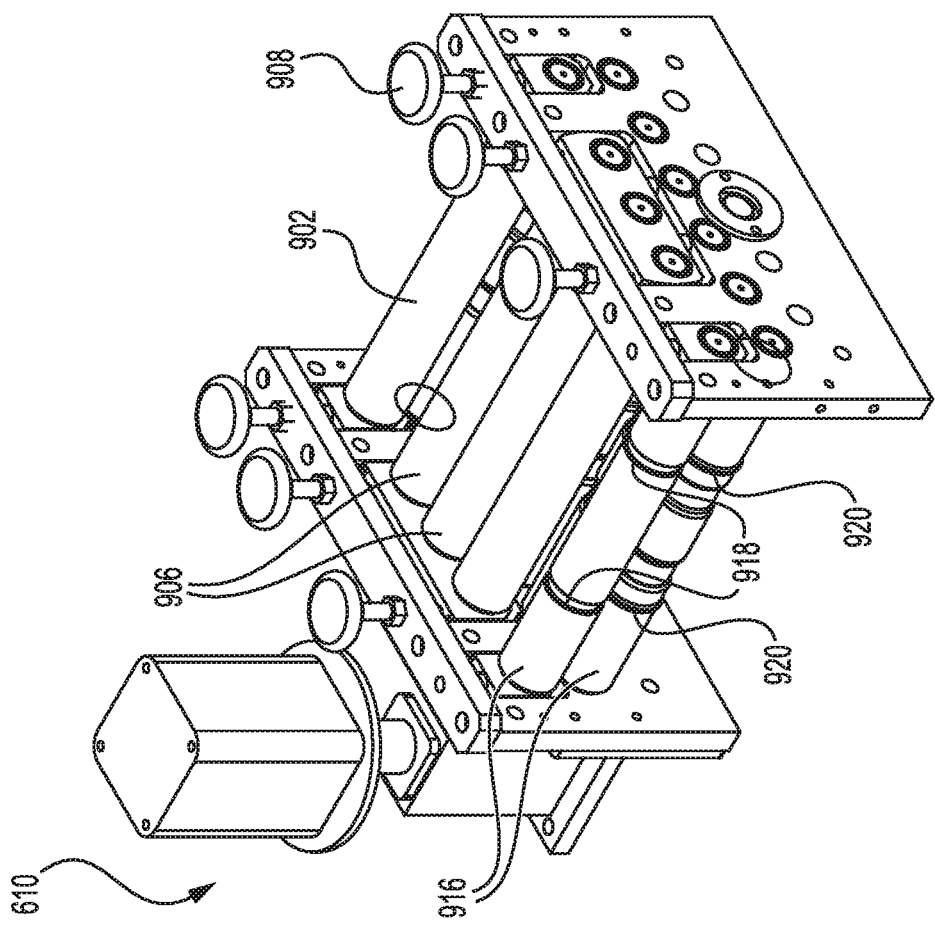

Levelling unit 610 is depicted in a perspective view and a side views in FIGS. 9A and 9B. The flexible duct connector stock 100 is fed through a plurality of pinch rollers 902 and lower rollers 904. Only the lower rollers 904 may be powered or both the pinch rollers 902 and lower rollers 904 may be powered.

The pinch rollers 902 and lower rollers 904 at the opposing ends of levelling unit 610 are aligned as shown in FIG. 9B. These sets of rollers help to smoothly feed the flexible duct connector stock 100 from spreading out and guiding unit 608 to notching unit 612. A central set of rollers 906, comprising three pinch rollers 902 and four lower rollers 904, are offset from each other. As the flexible duct connector stock 100 is fed through the central set of rollers 906, the offset helps to flatten the flexible duct connector stock 100 to remove any remaining curvature from the roll. A plurality of adjustment knobs 908 can be used to adjust the heights of pinch rollers 902, individually or in unison, to accommodate materials of different thickness.

Figure 10:
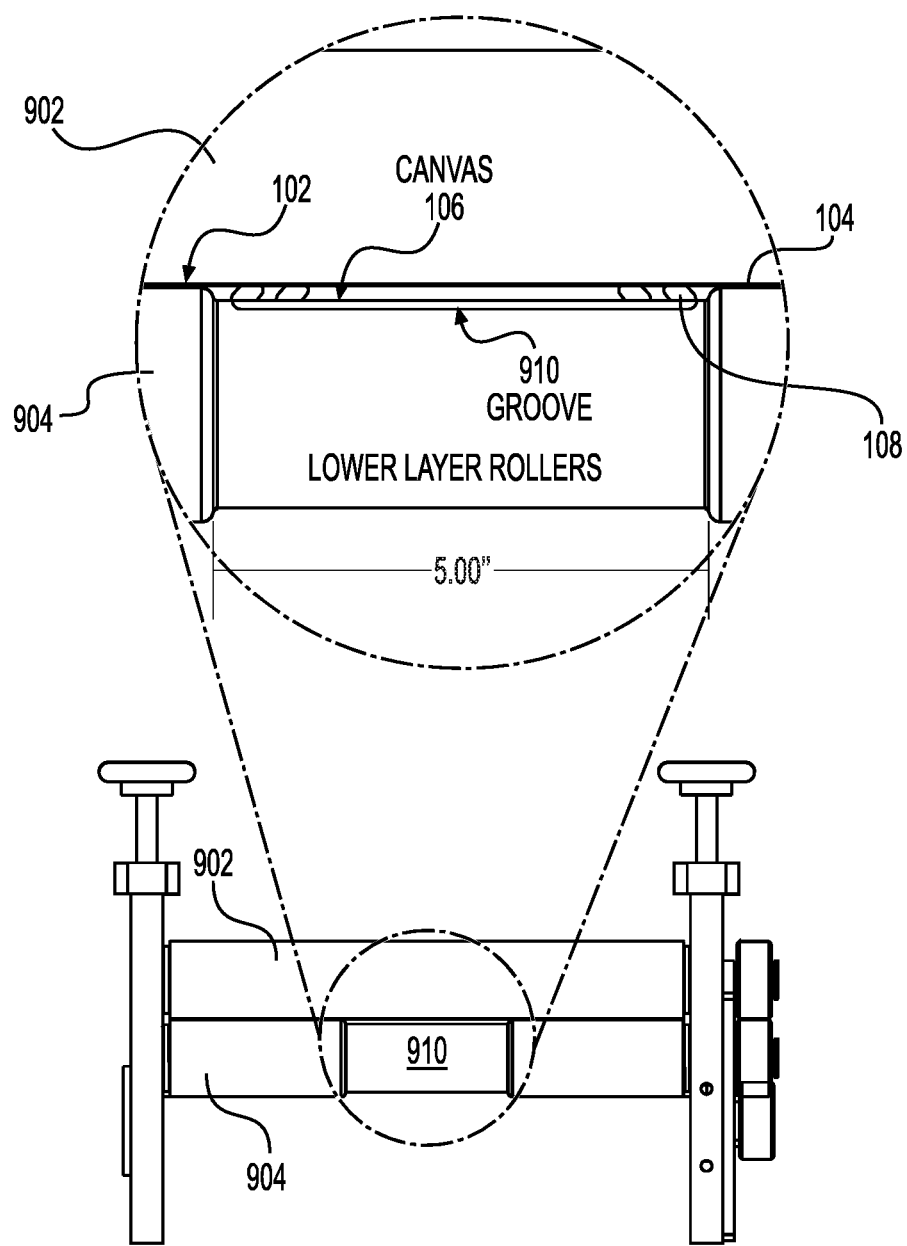
FIG. 10 depicts a front view of the levelling unit.

FIG. 10 provides a head on view of the coupling between a pinch roller 902 and lower roller 904. In a first embodiment, each lower roller 904 comprises a groove 910 along its center. The groove is preferably 5" in width and has a depth not exceeding a total height of flexible duct connector stock 100. The groove 910 ensures that the flexible duct connector stock 100 is flattened and not warped as it passes through levelling unit 610. The callout in FIG. 10 depicts the positioning of the flexible duct connector stock 100 between rollers 902 and 904. Specifically, the canvas 106 and the seams 108 are positioned within groove 910 whereas the metal strips 102 and 104 are sandwiched between rollers 902 and 904 for flattening.

Figure 11:
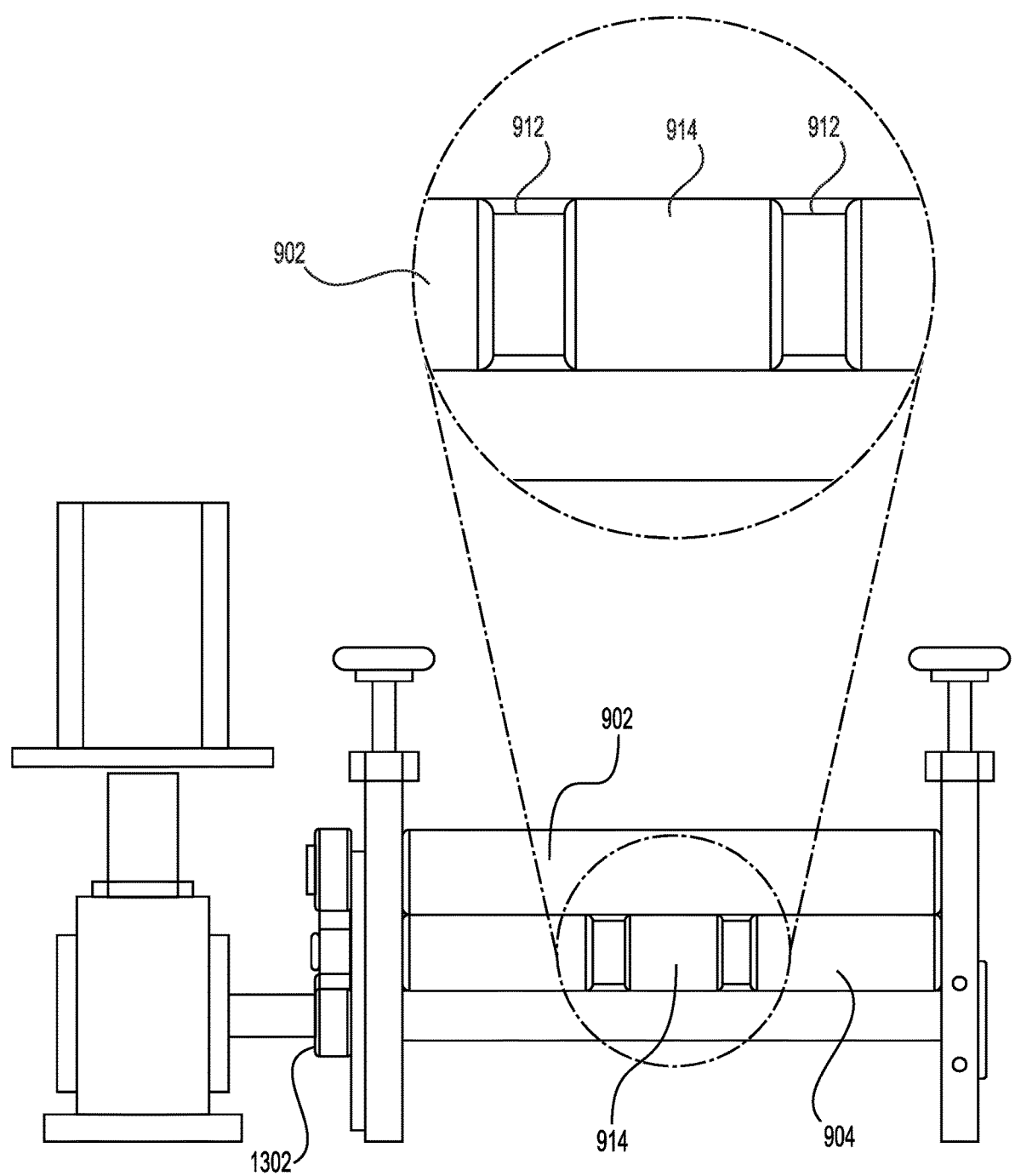
FIG. 11 depicts an alternate embodiment of the levelling unit.
Figure 12A:
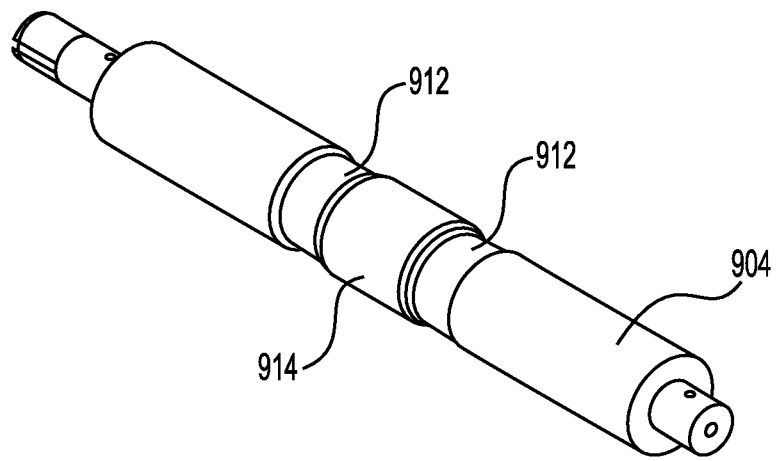
FIGS. 12A-12B depicts an alternate embodiment of a lower roller.
Figure 12B:
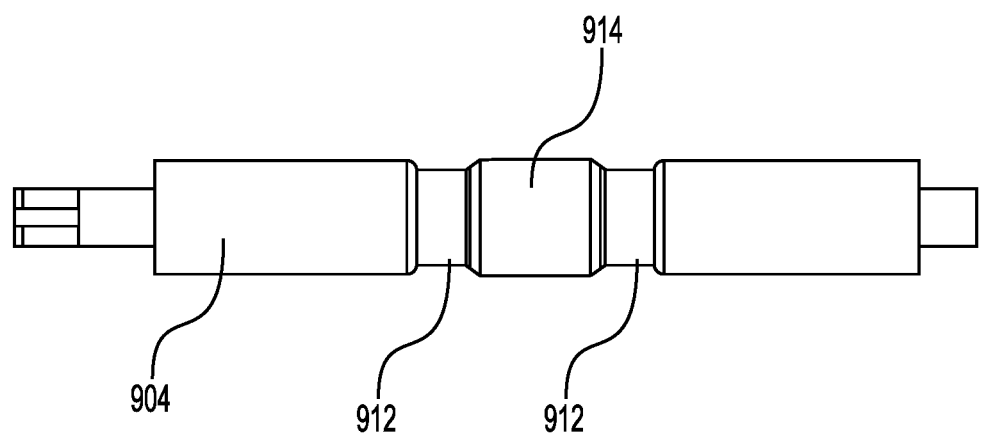

FIGS. 11 and 12A-12B depict an alternate configuration for lower rollers 904. In this embodiment, each lower roller 904 instead has two grooves 912 separated by a section 914 of lower roller 904 not having a diminished height. The grooves 912 are spaced such that they can accommodate the total height of flexible duct connector stock 100 in the vicinity of seams 108 which are the thickest part. This embodiment of lower roller 904 also enables processing machine 604 to be used to cut regular sheet metal, if desired.

Referring back to FIGS. 9A-9B, the last set of aligned rollers are preferably configured as beading rollers 916. The upper roller 902 of beading rollers 916 comprises a groove 918 which mates with rib 920. The mating of the groove 918 with rib 920 causes beading rib 1602 (FIG. 16) to form as the flexible duct connector stock 100 passes through beading rollers 916. The beading rollers 916 can either be the first or last set of aligned rollers in levelling unit 610 (or both). If no beading rib 1602 is desired, the separation between the beading rollers 916 can be adjusted so that no beading rib 1602 forms.

The rollers forming beading rollers 916 are shown in greater detail in FIGS. 12C-12D. As shown in FIG. 12C, the upper roller 902 of beading rollers 916 comprises two grooves 918. Preferably, grooves 918 have a rectangular or square cross-section as depicted. The lower roller 904 of beading rollers 916 is depicted in FIG. 12D. Ribs 920 are preferably triangular in cross-section with a pointed or flat top. The combination of grooves 918 and ribs 920 forms beading ribs 1602 in flexible duct connector stock 100 shown in FIG. 16.

Figure 13:
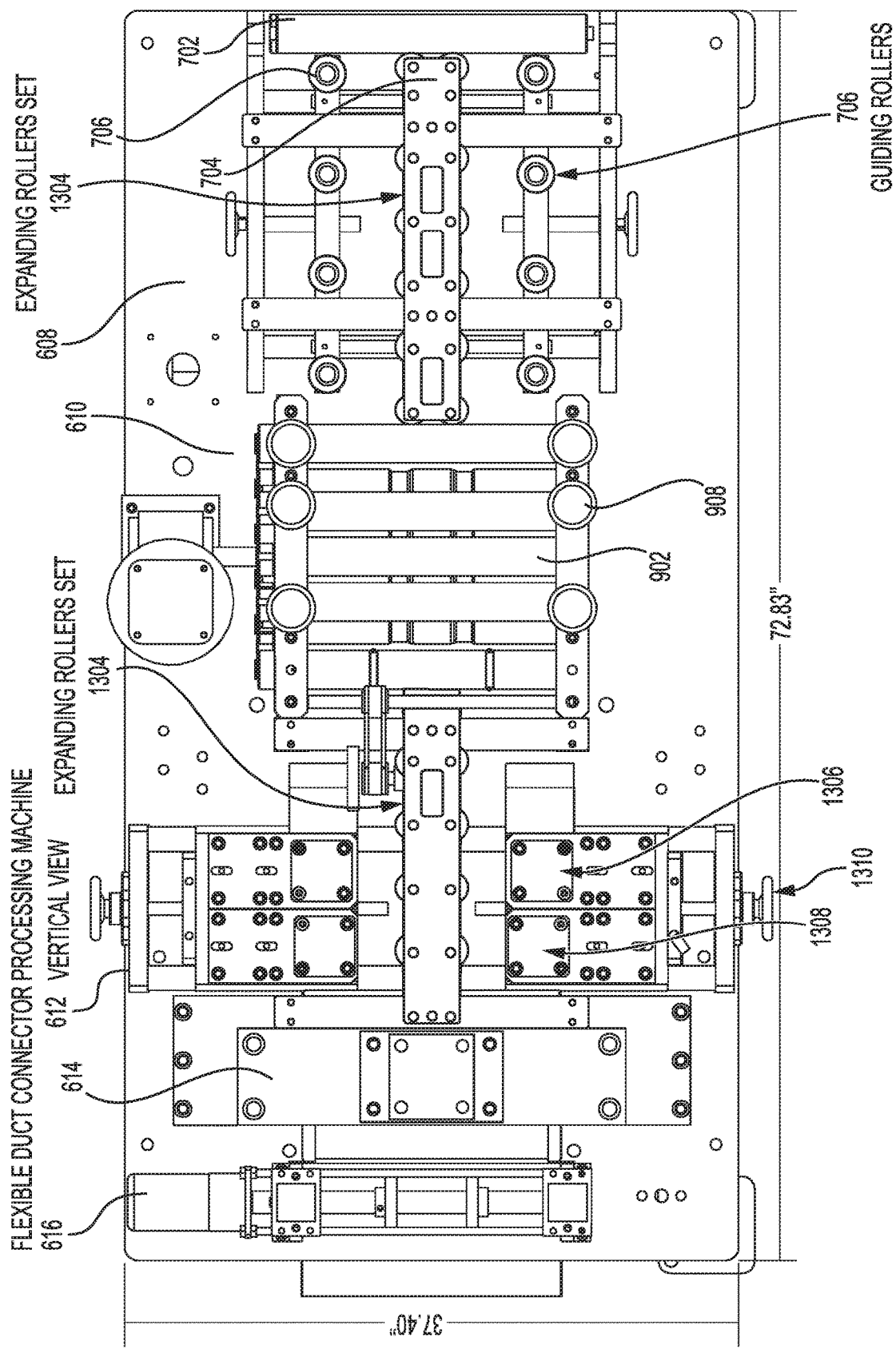
FIG. 13 depicts an overhead view of the processing machine.

As shown in FIG. 11, a measuring roller 1302 contacts flexible duct connector stock 100 as it passes through levelling unit 610 as depicted in FIG. 13. An encoder, coupled to the measuring roller 1302, communicates the measurement information to the control system 606 so that the flexible duct connector stock 100 can accurately be notched, sheared, and severed at the correct locations by temporarily pausing the progress of the flexible duct connector stock through processing machine 604 while the notches or cuts are being made. It should be obvious to one of ordinary skill in the art can be utilized by control system 606 to monitor the progress of flexible duct connector stock 100 through processing machine 604.

After the flexible duct connector stock 100 passes through levelling unit 610, it is passed to notching unit 612 which cuts/stamps the appropriate Vee notches or cut notches in accordance with the instructions received from control system 606. The Vee notches and the cut notches are preferably cut by stamping metal strips 102 and 104 at the appropriate locations. The stamped out portions of metal strips 102 and 104 fall into the body of processing machine 604 down a chute 618 for later collection.

As depicted in FIG. 13, the notching unit 610 also comprises a plurality of expansion rollers 1304 similar to those contained within the spreading out and guiding unit 608 as depicted in FIG. 13. This maintains the spread of the fabric 106 as the notching and shearing occurs. The expansion roller sets 604 and 1304 maintain the spread and flat state of the flexible duct connector stock 100 which allows the notching to be accurate.

Notching unit 612 further comprises Vee notch unit 1306 and square notch unit 1308 for making Vee notches and cut notches, respectively. A notch depth adjustment 1310 can be used to adjust the depth of the notches cut on each metal rail 102 and 104.

Figure 14:
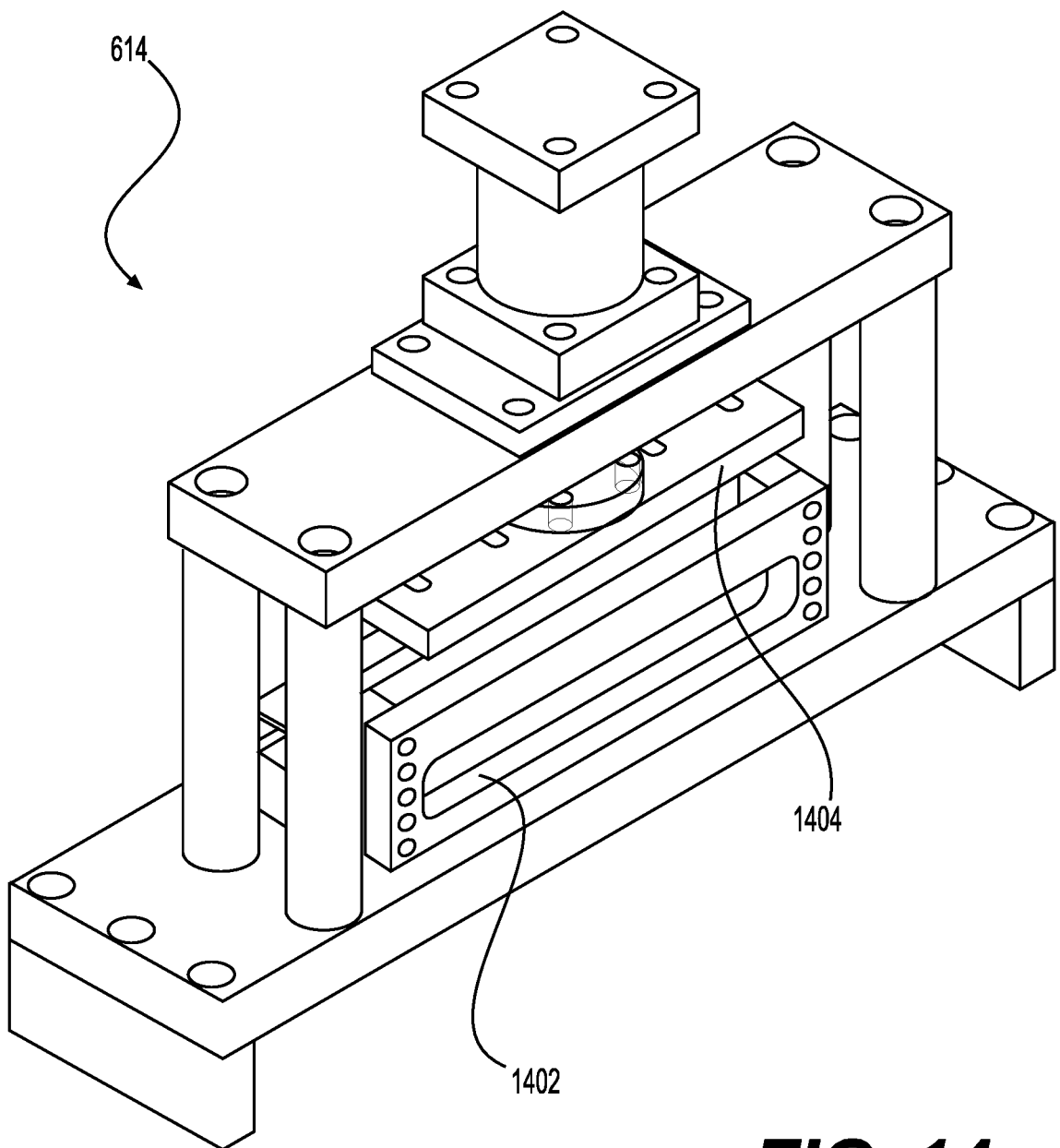
FIG. 14 depicts a perspective view of the shearing unit

Shearing unit 614 is used to sever each duct connector frame has been completed. FIG. 14 depicts a side perspective view of shearing unit 614. The flexible duct connector material 100 is fed through slot 1402. When it reaches the appropriate location, a blade 1404 is pressed downward to cause the material to be sheared.

Figure 15:
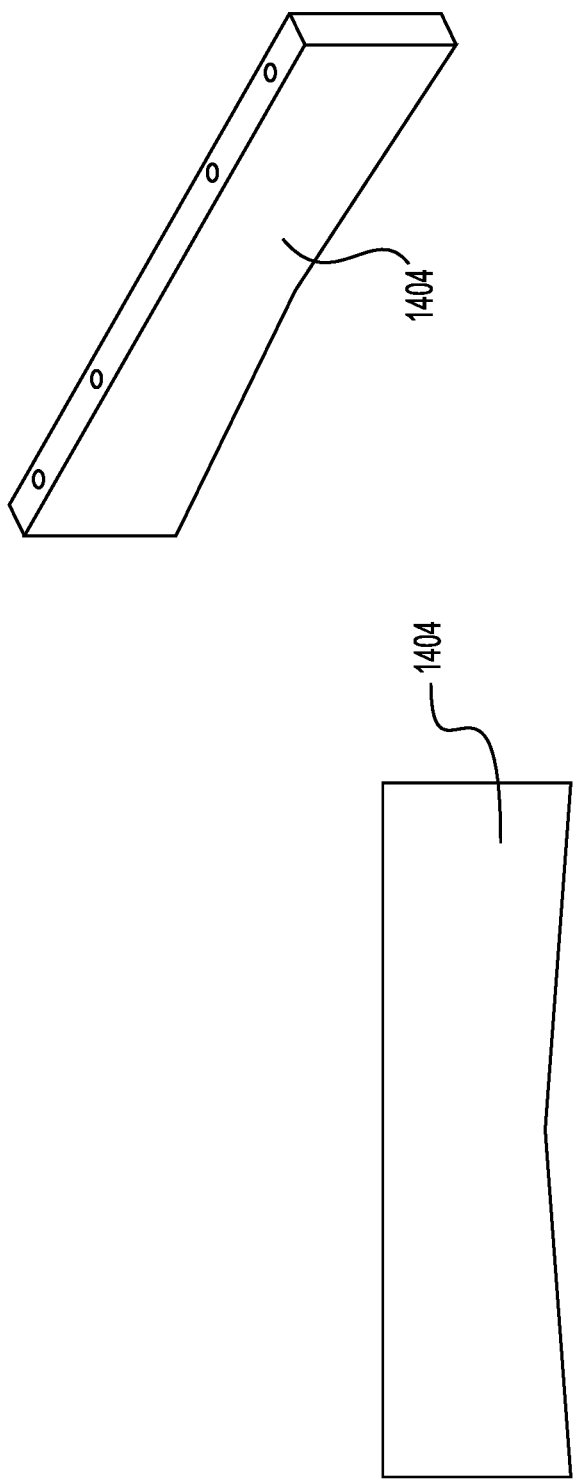
FIG. 15 depicts views of the blade of the shearing unit.

Preferably a bottom edge of the blade is not flat and has an inverted V-shape which causes metal rails 102 and 104 to be sheared slightly before fabric 106 as depicted in FIG. 15. Other blade shapes may not cause as accurate or reliable a cut as blade 1404.

A pulling out unit 616, located after the shearing unit 614, comprises two rollers for ejecting the sheared flexible duct connector stock 100 from the processing machine 604. All waste from the notch cutting falls into notch chute 618 where it can be collected.

The sheared flexible duct connector stock 100 may then fall onto a conveyor system controlled by control system 606. As different frame types are cut, the control system 606 may allow them to stack up on the conveyor system and then be moved out of the way so that the next type of cut can be stacked. This allows the control system 606 to easily separate different cut types which is important in a large scale job which may require different cut patterns for frames.

Figure 16:
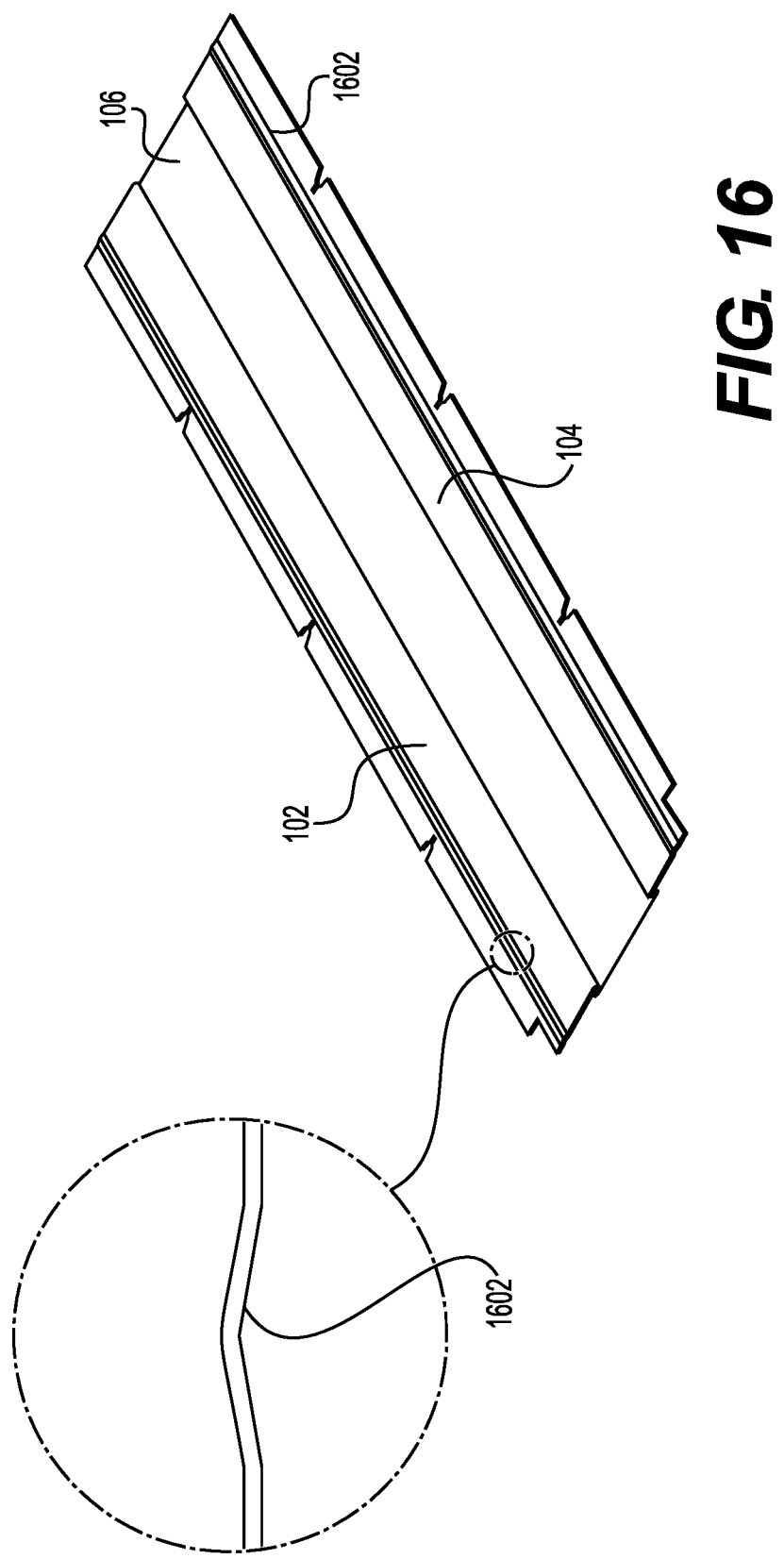
FIG. 16 depicts a beading rib added to the metal rails of the flexible duct connector stock.

FIG. 16 depicts the beading rib 1602 added to flexible duct connector stock 100 as it passes through beading rollers 916. The beading rib 1602 helps to provide torsional stability and rigidity to the sheared flexible duct connector stock 100 after it is assembled into a frame.

The beading rib 1602 is automatically added to metal rails 102 and 104 of flexible duct connector stock 100. As the flexible duct connector stock 100 passes through the beading rollers 916, the ribs 920 cause deformation of the flexible duct connector stock to form beading rib 1602.

The invention claimed is:

1. A flexible duct connector processing apparatus comprising:
    a control unit for automating operation of the flexible duct connector processing apparatus;
    a pulling-out unit for feeding flexible duct connector stock into the flexible duct connector processing apparatus;
    a spreading out and guiding unit for tensioning a fabric of the flexible duct connector stock;
    a levelling unit for removing any curvature from the flexible duct connector stock;
    a notching unit for cutting notches in metal strips of the flexible duct connector stock; and
    a shearing unit for automatically cutting the flexible duct connector stock to a predetermined length.

2. The flexible duct connector processing apparatus according to claim 1, wherein the control unit comprises:
    a touch-screen display,
    wherein the control unit controls the notching unit to cut notches at predetermined positions along the predetermined length according to a plurality of predetermined notch patterns.

3. The flexible duct connector processing apparatus according to claim 1, wherein the pulling-out unit comprises:

at least one set of opposing feeding rollers controlled by the control unit.

4. The flexible duct connector processing system according to claim 1, wherein the spreading out and guiding unit comprises:
an expandable roller set comprising a first set of rollers and a second set of rollers,
wherein the first set of rollers engages a first seam of the flexible duct connector stock, and
wherein the second set of rollers engages a second seam of the flexible duct connector stock.

5. The flexible duct connector processing system according to claim 4,
wherein each roller of the first set of rollers is aligned with a Corresponding roller of the second set of rollers.

6. The flexible duct connector processing system according to claim 4, wherein the spreading out and guiding unit further comprises:
a first plurality of guide rollers; and
a second plurality of guide rollers,
wherein the first plurality of guide rollers engage a first metal strip edge of the flexible duct connector stock, and
wherein the second plurality of guide rollers engage a second metal strip edge of the flexible duct connector stock.

7. The flexible duct connector processing system according to claim 6,
wherein a distance between the first plurality of guide rollers and the second plurality of guide rollers is adjustable using a first adjustment guide for the first plurality of guide rollers and a second adjustment guide for the second plurality of guide rollers.

8. The flexible duct connector processing system according to claim 7, wherein the first adjustment guide and the second adjustment guide are independently adjustable.

9. The flexible duct connector processing system according to claim 6,
wherein a rotation axis of the first set of rollers, a rotation axis of the second set of rollers, a rotation axis of the first plurality of guide rollers, and a rotation axis of the second plurality of guide rollers are all parallel.

10. The flexible duct connector processing system according to claim 4,
wherein a distance between the first set of rollers and the second set of rollers is adjustable.

11. The flexible duct connector processing system according to claim 4,
wherein the first set of rollers exerts an outward spring force on the first seam, and
wherein the second set of rollers exerts an outward spring force on the second seam.

12. The flexible duct connector processing system according to claim 1, wherein the notching unit comprises:
a Vee notch unit for cutting Vee notches in a first metal strip of the flexible duct connector material and a second metal strip of the flexible duct connector material; and
a square notch unit for cutting square notches in the first metal strip and the second metal strip.

13. The flexible duct connector processing system according to claim 1,
wherein a cutting blade of the shearing unit has an inverted V-shape.

14. The flexible duct connector processing system according to claim 1, wherein the levelling unit comprises:
a plurality of pinch rollers; and
a plurality of lower rollers,
wherein the plurality of lower rollers each comprises a centered groove having a predetermined width.

15. The flexible duct connector processing system according to claim 1, wherein the levelling unit comprises:
a plurality of pinch rollers; and
a plurality of lower rollers,
wherein each lower roller comprises:
a first groove having a predetermined width; and
a second groove having a second predetermined width,
wherein a center of the first groove and a center of the second groove are a same distance from a center of the lower roller.

16. The flexible duct connector processing system according to claim 15,
wherein a first set of pinch rollers are vertically offset from a second set of pinch rollers.

17. The flexible duct connector processing system according to claim 15,
wherein a first pinch roller of the plurality of pinch rollers and a first lower roller of the plurality of lower rollers are in vertical alignment.

18. The flexible duct connector processing system according to claim 17,
wherein the first pinch roller comprises at least one groove,
wherein the first lower roller comprises at least one rib,
wherein a mating of the rib and the groove forms a beading rib along at least one metal strip of the flexible duct connector stock.

19. A flexible duct connector processing system comprising:
a decoiler for holding at least one roll of flexible duct connector stock,
wherein the flexible duct connector stock comprises a first metal strip edge joined to a center fabric portion by a first seam and a second metal strip edge joined to the center fabric portion by a second seam; and
a processing unit comprising:
a control unit for controlling the processing unit;
a pulling-out unit for pulling the flexible duct connector stock from the at least one roll;
a spreading out and guiding unit for tensioning the center fabric portion of the flexible duct connector stock, the spreading out unit comprising:
an expansion roller set that engages an interior of the seam and the second seam of the flexible duct connector stock; and
a guide roller set that engages the first metal strip edge and the second metal strip edge of the flexible duct connector stock;
a levelling unit for removing any curvature from the flexible duct connector stock;
a notching unit for adding notches to metal strips of the flexible duct connector stock; and
a shearing unit for automatically cutting the flexible duct connector stock to a predetermined length.

20. The flexible duct connector processing system according to claim 19, wherein the expansion roller set is vertically offset from the guide roller set.

* * * * *